(12) United States Patent
Schermann et al.

(10) Patent No.: US 11,003,158 B2
(45) Date of Patent: May 11, 2021

(54) METHOD FOR 3D RADIUS CORRECTION IN CNC MILLING AND ASSOCIATED MILLING MACHINE

(71) Applicant: Siemens Aktiengesellschaft, Munich (DE)

(72) Inventors: Aleksandra Schermann, Leinfelden-Echterdingen (DE); Ralf Spielmann, Stuttgart (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/660,335

(22) Filed: Oct. 22, 2019

(65) Prior Publication Data

US 2020/0125063 A1 Apr. 23, 2020

(30) Foreign Application Priority Data

Oct. 23, 2018 (EP) .................................... 18201953

(51) Int. Cl.
*G05B 19/402* (2006.01)

(52) U.S. Cl.
CPC .. *G05B 19/402* (2013.01); *G05B 2219/41113* (2013.01); *G05B 2219/45145* (2013.01)

(58) Field of Classification Search
CPC .................................................. G05B 19/402
USPC ......................................... 700/160; 318/560
See application file for complete search history.

(56) References Cited

U.S. PATENT DOCUMENTS 5,563,484 A 10/1996 Otsuki et al.
9,829,308 B2* 11/2017 Stewart .............. G01B 11/0616
2007/0172320 A1 7/2007 Glaesser

FOREIGN PATENT DOCUMENTS

DE 10330828 A1 2/2005

OTHER PUBLICATIONS

Siemens—Manual "Milling with SINUMERIK, Mold of 3- to 5-axis simultaneous milling", Edition Sep. 2011.

* cited by examiner

*Primary Examiner* — David Luo
(74) *Attorney, Agent, or Firm* — Henry M. Feiereisen LLC (57) ABSTRACT

In a method for 3D radius correction in CNC milling, a mill path of an original milling tool producing a surface contour on a workpiece is calculated for an original milling tool based on dimensions of the mill cutter tip, with the positions of the mill cutter tip specified by an NC program. A surface normal of an end face milling surface and a surface normal of a circumferential milling surface are then specified, for each position of the mill cutter tip taking into account dimensional differences between an actually available milling tool and the original milling tool. By specifying along the mill path a spatial orientation of the milling tool axis, a correction vector is specified from the milling tool orientation, dimensional differences and the surface normals, and the workpiece is machined by traversing the mill path with the actual milling tool under consideration of the correction vector.

6 Claims, 5 Drawing Sheets

METHOD FOR 3D RADIUS CORRECTION IN CNC MILLING AND ASSOCIATED MILLING MACHINE

CROSS-REFERENCES TO RELATED APPLICATIONS

This application claims the priority of European Patent Application, Serial No. 18201953.9, filed Oct. 23, 2018, pursuant to 35 U.S.C. 119(a)-(d), the disclosure of which is incorporated herein by reference in its entirety as if fully set forth herein.

BACKGROUND OF THE INVENTION

The present invention relates to a method for 3D radius correction in CNC milling and to a correspondingly constructed milling machine.

The following discussion of related art is provided to assist the reader in understanding the advantages of the invention, and is not to be construed as an admission that this related art is prior art to this invention.

High surface quality, precision and speed without any rework are the main advantages of mold making. Here the typical workflow is the process chain CAD-CAM-PP-CNC. The construction and design of freeform surfaces which are produced as a digital model with a CAD system are typical of mold making. On the basis of the digital model, a CAM station is used to fix the individual machining steps and to calculate machining paths. The machining program is finally generated in a post processor (PP) in a general or standardized language for paths in the machining tools and control commands in the CNC machine. The path is generally output at the tool tip in NC code. In the machine tool environment, paths are therefore generated in the CAD-CAM-PP-CNC process from digital models, said paths then generating a workpiece on a machine tool from an unmachined part if a tool defined in the CAD-CAM process moves along the paths.

Frequently, in reality, the tool defined in the CAD-CAM process may not be available on the machine tool, and only a very similar tool is available. If a milling tool (or mill) with a specific diameter, a specific length and a specific cutting length is defined in the CAD-CAM process, for example, and only one mill with one, albeit only minimally reduced diameter, is available on the machine tool, the workpiece cannot be manufactured or can only be produced by compromising accuracy and surface quality.

In order still to manufacture the desired workpiece true to size, machine tool controllers incorporate a function for 3D radius correction.

Methods for a 3D radius correction for various milling methods are known in the art. For example, the function of the 3D radius correction may compensate, for example, for a smaller tool radius, so that the desired surface can be generated.

With 3D radius correction in face milling, referred to for example by "CUT3DF", the correction direction must additionally also be determined as well as specifying the mill geometry. In the case of face milling from the surface normal, the correction direction is calculated from the tool direction and from the tool geometry.

With 3D radius correction in circumferential milling, referred to for example by "CUT3DC", the correction takes place orthogonally to the path tangent and to the tool direction. The correction direction can therefore be described by the normal vector of the surface at the intervention point of the tool on the workpiece.

Furthermore, the term "CUT3DCC" may specify a tool radius correction with a combined circumferential and face milling. Here the main machining surface is generated using circumferential milling, wherein the surface normal of this circumferential milling surface is always orthogonal to the tool orientation. For 3D radius correction, only the surface normal of the limiting surface, in other words the surface to be machined by way of face milling, is communicated to the machine tool controller by way of the NC program.

If, while milling a workpiece, for example when the mill passes through the programmed path with its mill cutter tip, material is removed both with the face side and with the circumference of the mill, there are simultaneously two machining paths or milling paths on the workpiece: the machining path or milling path of the end face and the machining path or milling path of the circumference of the mill. A 3D radius correction can nevertheless be carried out in each case only for one of the machining paths or milling paths. If a 3D radius correction is to be carried out with both machining paths or milling paths, this must take place individually for each machining path or milling path, the machining must be divided into any order of face and circumferential machining. The workpiece can therefore not be manufactured simultaneously with the desired accuracy on the two machining surfaces with one individually programmed mill path.

It would be desirable and advantageous to obviate prior art shortcomings and to provide an improved method for CNC milling with a 3D radius correction while simultaneously machining with face and circumferential milling.

SUMMARY OF THE INVENTION

According to one aspect of the present invention, a method for 3D radius correction in CNC milling includes calculating for an original milling tool a mill path in form of positions of the original milling tool that produces a surface contour on a workpiece, with an NC program, specifying positions of a mill cutter tip on the workpiece based on dimensions of the mill cutter tip, for which the mill path producing the surface contour has been calculated, specifying dimensional differences between a milling tool actually available for machining the workpiece, and the original milling tool, specifying, for each position of the mill cutter tip, a surface normal of an end face milling surface and a surface normal of a circumferential milling surface, specifying, for each position of the mill path, a milling tool orientation, which specifies a spatial orientation of the milling tool axis, specifying, for each position of the mill path, a correction vector from the milling tool orientation and the dimensional differences and the surface normal of the end face milling surface and the surface normal of the circumferential milling surface, and machining the workpiece to produce the surface contour by simultaneous end face milling and circumferential milling by traversing the mill path specified by the NC program with the actually available milling tool and correcting the dimensional differences with the correction vector.

It is therefore possible in accordance with the present invention to produce accurate and high-quality surfaces using a simultaneous face and circumferential milling, which takes place by way of an individually programmed milling path, if differences in dimension exist between the mill defined in the CAD-CAM process and the mill actually available and used. The mill path is defined by the positions of the mill cutter tip to be passed through consecutively. The direction of the surface normals of the two surfaces to be machined simultaneously is made available by means of the NC program of the CAD-CAM process similarly to the mill path and the mill orientation of the controller of the milling machine. The original mill including its dimensions is predetermined to the controller by way of the NC program, for instance.

The present invention can also be understood to mean face milling with a limiting surface. Here, however, the surface normal for face milling does not need to be orthogonal to the tool orientation like with circumferential milling with a limiting surface. For a face milling according to the present invention with limiting surface, two surface normals are predetermined for each machining block, i.e. the surface normal for the face milling surface and the surface normal for the circumferential milling surface.

According to another advantageous feature of the present invention, a first auxiliary correction vector can be formed from the mill orientation and the differences in dimension of the mill which is actually available and the surface normals for face milling, a second auxiliary correction vector can be formed from the mill orientation and the differences in dimension of the mill which is actually available and the surface normals for circumferential milling, and the correction vector can be determined from the first auxiliary correction vector and the second auxiliary correction vector by way of vector addition. Thus, auxiliary correction vectors are determined for each of the milling paths to form the correction vector required during simultaneous machining by adding the first and second auxiliary correction vectors by vector addition.

According to another advantageous feature of the present invention, when the milling tool is a ball end mill, the first auxiliary correction vector can be determined from the milling head orientation, the surface normal for end face milling and a radius difference of a ball head of the ball end mill, according to the relationship $V_s=(w-f_s)\cdot\Delta R$, wherein $V_s$ is the first auxiliary correction vector, w is the milling head orientation, $f_s$ is the surface normal for end face milling, and $\Delta R$ is the radius difference, and the second auxiliary correction vector can be determined from the surface normal for circumferential milling and the radius difference of the ball head according to the relationship $V_u=(-f_u)\cdot\Delta R$, wherein $V_u$ is the second auxiliary correction vector, $f_u$ is the surface normal for circumferential milling, and $\Delta R$ is the radius difference, and the correction vector can be determined by adding $V_s$ or $V_u$ according to the relationship $V=(V_s+V_u)$.

According to another advantageous feature of the present invention, when the milling tool is an end mill with corner rounding, the dimensional difference can be determined only from a radius difference of a shank radius of the end mill, the first auxiliary correction vector can be determined from the milling head orientation, the surface normal for end face milling and the radius difference according to the relationship $V_s=((w\times f_s)\times w)\cdot\Delta R$, wherein $V_s$ is the first auxiliary correction vector, w is the milling head orientation, $f_s$ is the surface normal for end face milling, and $\Delta R$ is the radius difference, and the second auxiliary correction vector can be determined from the surface normal for circumferential milling and the radius difference according to the relationship $V_u=(-f_u)\cdot\Delta R$, wherein $V_u$ is the second auxiliary correction vector, $f_u$ is the surface normal for circumferential milling, and $\Delta R$ is the radius difference, and the correction vector can be determined by adding $V_s$ or $V_u$ according to the relationship $V=(V_s+V_u)$.

According to another advantageous feature of the present invention, when the milling tool is an end mill with corner rounding, the dimensional difference can be determined from a radius difference of a shank radius of the end mill and a radius difference of a rounding radius of the end mill, the first auxiliary correction vector can be determined from the milling head orientation, the surface normal for end face milling and the radius differences according to the relationship $V_s=((w\times f_s)\times w)\cdot(\Delta R-\Delta r)+(w-f_s)\cdot\Delta r$, wherein $V_s$ is the first auxiliary correction vector, w is the milling head orientation, $f_s$ is the surface normal for end face milling, $\Delta R$ is the radius difference of the shank radius and $\Delta r$ is the radius difference of the rounding radius, and the second auxiliary correction vector can be determined from the surface normal for circumferential milling and the radius difference according to the relationship $V_u=(-f_u)\cdot\Delta R$, wherein $V_u$ is the second auxiliary correction vector, $f_u$ is the surface normal for circumferential milling, and, $\Delta R$ is the radius difference of the shank radius, and the correction vector can be determined by adding $V_s$ or $V_u$ according to the relationship $V=(V_s+V_u)$.

Thus, in accordance with the present invention, the correction vector can be determined by vector addition of $V_s$ or $V_u$ according to the relationship $V=(V_s+V_u)$.

According to another aspect of the present invention, a numerically controlled milling machine includes a machine tool controller, which is constructed to carry out a 3D radius correction while simultaneously milling a workpiece using face and circumferential milling and is configured to calculate for an original mill a mill path in form of positions of an original milling tool that produces a surface contour on the workpiece, to specify, with an NC program, positions of a mill cutter tip on the workpiece based on dimensions of the mill cutter tip, for which the mill path producing the surface contour has been calculated, to specify dimensional differences between a milling tool actually available for machining the workpiece, and the original milling tool, to specify, for each position of the mill cutter tip, a surface normal of an end face milling surface and a surface normal of a circumferential milling surface, to specify, for each position of the mill path, a milling tool orientation, which specifies a spatial orientation of the milling tool axis, to specify, for each position of the mill path, a correction vector from the milling tool orientation and the dimensional differences and the surface normal of the end face milling surface and the surface normal of the circumferential milling surface, and to cause the milling machine to produce the surface contour of the workpiece by simultaneous end face milling and circumferential milling by traversing the mill path specified by the NC program with the actually available milling tool and correcting the dimensional differences with the correction vector.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Regarding the employed nomenclature, vectors representing a directional variable in space with a specific magnitude are used in the description and in the figures. The vectors in the figures are identified with an arrow, whereas the vectors in the description are written in italics and in bold for distinction from the scalar variables.

It should be expressly mentioned here to the fact that in contrast to known radius corrections, the correction direction for the circumferential milling surface in the exemplary embodiments described below need not be aligned perpendicular to the tool orientation.

Figure 1:
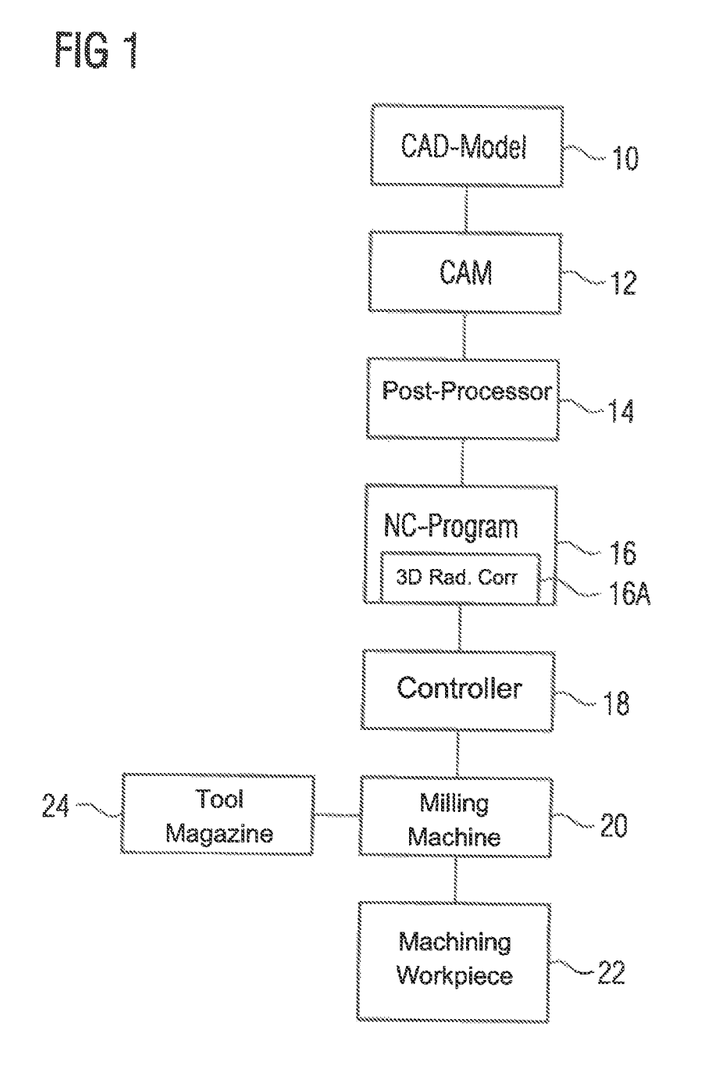
FIG. 1 shows an overview image of a process sequence for creating free-form surfaces in mold making according to the present invention.

Turning now to the drawing, and in particular to FIG. 1, there is shown an overview of a typical process chain for 5-axis milling for producing free-form surfaces in mold making. The start of the process chain involves the construction and the design of a CAD model 10 of a workpiece to be produced, wherein the workpiece is essentially described by way of its surface form. The CAD model 10 is then transferred to a CAM system 12. In the CAM system 12, the machining for the different geometries of the workpiece is then defined with the strategies suited thereto in order to generate the individual machining steps and calculate the paths of a mill to be used. The data of the machining tools is generally read out from the tool databases. After simulating the calculated tool paths or machine movements, a post processor 14 converts the work steps into a corresponding NC program 16 by taking into account a control-specific syntax and special control functions.

The control commands needed for a specific milling machine 20 in order to machine 22 the workpiece to be produced are prepared in a machine tool controller 18 from the instructions of the NC program 16. For machining purposes, various mills held in a tool magazine 24 are available to the milling machine 20.

Since in reality the mill defined in the CAD-CAM process frequently is not available on the milling machine 20, instructions 16A are available in the NC program 16, with which a 3D radius correction can take place, so that the NC program 16 is independent of the dimensions of the mill actually used to a certain extent.

Figure 2:
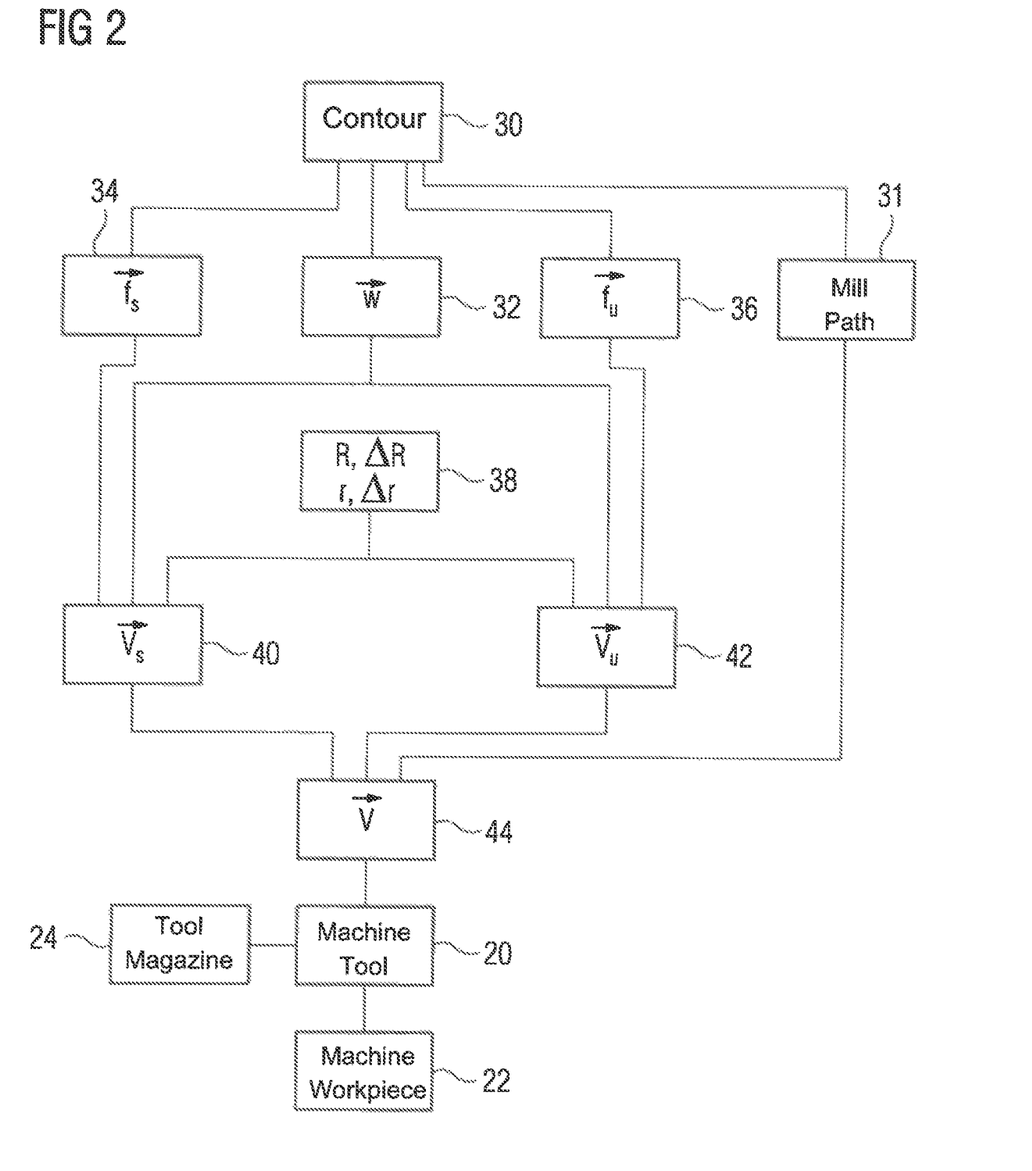
FIG. 2 shows a block image of the essential method steps of a 3D radius correction during simultaneous face and circumferential milling.

A method for 3D radius correction with a simultaneous machining of the workpiece using face and circumferential milling should be explained below on the basis of FIG. 2. The time required to machine the workpiece is shortened accordingly by simultaneously machining 22 the workpiece by way of two different contact points of the mill on the workpiece surface or by way of two different milling paths. Here a correction of differences in dimension takes place between the mill defined in the CAD-CAM process and the mill actually available for the machining both with face and also circumferential milling. During simultaneous face-circumferential milling the workpiece can therefore be produced with the available mill without foregoing accuracy and surface quality, although this does not correspond accurately to the defined mill.

In a first step 30, the contour provided for simultaneous face and circumferential milling of the workpiece is fixed in the CAM process 12. Corresponding machining paths are then calculated by applying the strategies and methods stored in the CAM process 12.

This further information specified above is prepared in the postprocessor 14 for an NC program 16 which can run on the machine tool 20. In a first method step, a milling path 31, for instance a path on the tool tip, currently the path of the mill cutter tip or the tool center point (TCP), is output as an NC code. In a second method step 32, the NC code contains information relating to the tool orientation w and in a third method step 34 relating to the surface normal $f_s$ of the face milling-milling path and in a fourth method step 36 relating to the surface normals $f_u$ for the circumferential milling-milling path.

The following significantly simplified cutout of an NC program of this type should explain the predetermination of the tool orientation w and the surface normals $f_s$ and $f_u$. The instruction N260 specifies that the subsequent instructions apply to a 3D radius correction with a simultaneous face-circumferential milling. In the following instructions N280, N290, N300, etc., the tool orientation w is described by way of the vector components A3, B3, C3 and the surface normal $f_s$ by way of the vector components Ax, Bx, Cx and the surface normal $f_u$ by way of vector components Ay, By, Cy. This information relating to the surface normals $f_s$, $f_u$ is reproduced here in bold only on account of improved visibility. The command "G41" in set N280 should refer to the first set or the start of the tool radius correction.

N260 CUT3DFCD; "3D-WRK with simultaneous face and circumferential correction"

N280 G01 X−20.505 Y7.541 Z45.047 A3=+0.168277208 B3=+0.054933772 C3=+0.984207835 Ax=+1. Bx=−0.000003008 Cx=+0.000000718 Ay=+1 By=−0.0006 Cy=0.8888312 G41

N290 G01 X−20.506 Y7.365 Z45.047 A3=+0.168631651 B3=+0.053835903 C3=+0.984207835 Ax=+1. Bx=−0.000004199 Cx=+0.000000719 Ay=+1 By=−0.0006 Cy=0.8888312

N300 G01 X−20.507 Y7.194 Z45.047 A3=+0.168973327 B3=+0.052753699 C3=+0.984207835 Ax=+1. Bx=−0.000007571 Cx=+0.000000721 Ay=+1 By=−0.0006 Cy=0.8888312

If the mill defined in the CAD-CAM process is not available in the tool magazine 24, but instead only a similar tool with slightly smaller dimensions, there is the possibility of communicating this to the NC program by way of corresponding inputs. To this end, a fifth method step 38 is provided. For instance, an end mill with a diameter D=30 mm, a length of L=150 mm and a cutting length of FL=50 mm is defined in the CAD-CAM process. Only a similar tool with a smaller diameter of D=29.9 mm is available however on the milling machine 20. These dimensions of the available mill or also the radius difference of ΔR=0.05 mm are communicated in the fifth method step 38 to the NC program 16.

In a sixth method step 40, a first auxiliary vector $V_s$ is now determined, which modifies the mill path for face milling calculated for the defined mill, such that when machining with the real mill, the predetermined first milling path for face milling has been passed through and the desired first sub contour would thus emerge.

Similarly to the sixth method step 40, a second auxiliary correction vector $V_u$ is determined in a seventh method step 42 and modifies the mill path for circumferential milling calculated for the defined mill such that when machining with the real mill, the predetermined second milling path for circumferential milling has been passed through and the desired second sub contour would then emerge.

The first and second auxiliary correction vectors $V_s$ or $V_u$ determined in method steps 40 and 42 are added up by vector addition in an eighth method step 44 to form a correction vector V for simultaneous face-circumferential milling. This correction vector V modifies the site of the mill cutter tip TCP such that the desired workpiece geometry is produced.

On the basis of the instructions in the NC program 16 including the correction vector V, the control commands required for machining the workpiece are determined for the simultaneous face and circumferential milling, if the mill actually available has differences in dimension compared with the defined mill. Here the machined workpiece has a similarly high quality to when it is produced with the defined mill.

If, upon activation of the 3D tool radius correction "CUT3DFCD", one of the normal vectors is not available, for instance due to a missing specification, an alarm sounds and the machining is aborted.

Figure 3:
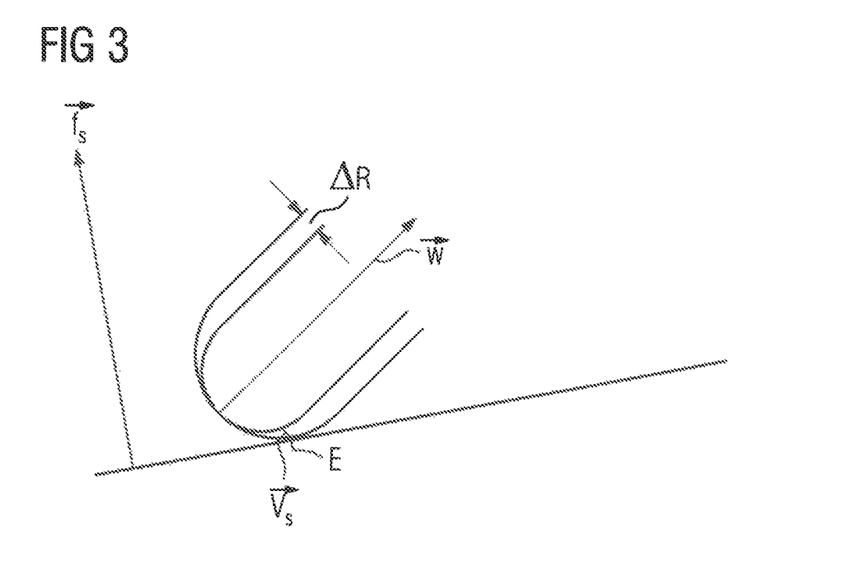
FIG. 3 shows a schematic diagram for forming a first auxiliary correction vector for face milling using a ball end mill.

When a ball mill is used for simultaneous face-circumferential milling, the associations shown in FIG. 3 are produced for the face milling path. The difference in radius of the ball end mill of the mill is identified with ΔR, the mill and its axis of rotation have the orientation w when the workpiece is machined, and the surface normal of the surface to be milled along the milling path has the value $f_s$ at each support point. The relationship $$V_s=(w-f_s)\cdot \Delta R$$

then applies for the first correction vector $V_s$.

Figure 4:
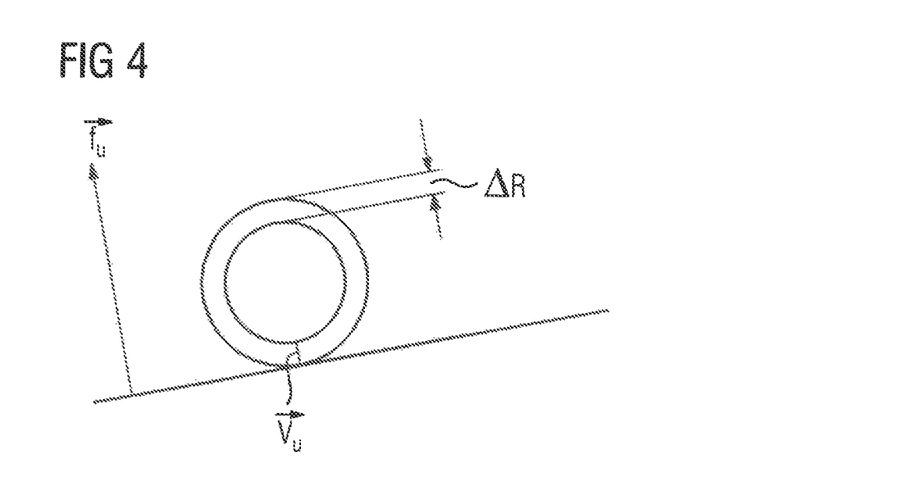
FIG. 4 shows a schematic diagram for forming a second auxiliary correction vector for circumferential milling using a ball end mill.

FIG. 4 indicates the determination of the auxiliary correction vector $V_u$ for circumferential milling. Here the auxiliary correction vector $V_u$ is independent of the mill orientation w. The surface normal of the surface to be milled along the milling path for circumferential milling has the value $f_u$ at each support point. The relationship $$V_u=(-f_u)\cdot \Delta R$$

applies.

It should be noted in FIGS. 3 and 4 that the difference in dimension from original mill to the mill which is actually available is shown disproportionately large for improved visibility. Moreover, FIGS. 3 and 4 show the initial situation or original position of the mill, as has been calculated for the original mill in order to process the milling paths. In other words: FIGS. 3 and 4 show the position before use of the tool radius correction. It should also be identified in FIGS. 3 and 4 that the mill path has to be corrected so that the milling paths for face and circumferential milling remain unchanged despite a modified tool.

Figure 5:
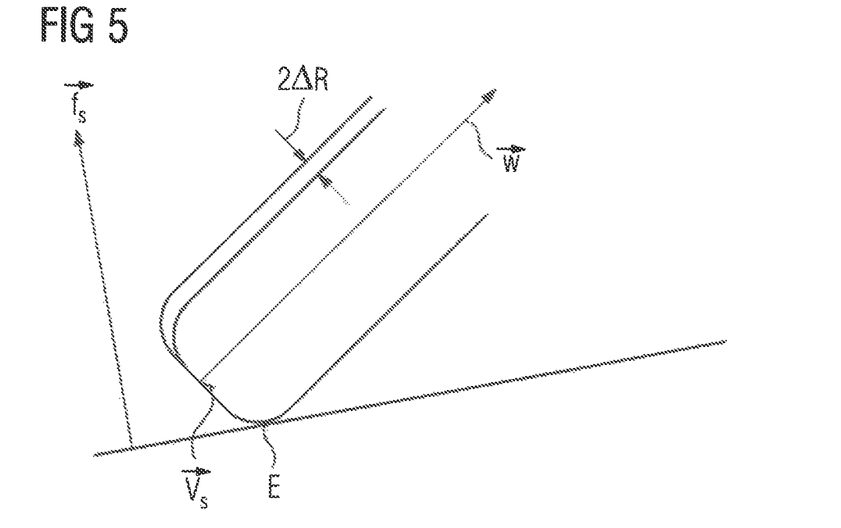
FIG. 5 shows a schematic diagram for forming a first auxiliary correction vector for face milling using an end mill with corner rounding.

The relationship when an end mill with corner rounding is used with a circumferential radius ΔR which is smaller compared with the defined mill is somewhat more complex, wherein the rounding radius of the mill used is unchanged compared with the defined mill. This case may occur if the rounding part of the mill is worn down so that it remains unchanged compared with the original mill, although the end radius R is reduced. This case is to be explained on the basis of FIG. 5. The first auxiliary correction vector $V_s$ for face milling is also dependent here on the orientation w of the mill in the space and the surface normals $f_s$ of the surface to be milled at each support point along the milling path. Here the auxiliary correction vector $V_s$ is determined in accordance with the following relationship:

$$V_s=((w\times f_s)\times w)\cdot \Delta R.$$

In this context the character "x" is representative of the formation of the cross product.

Figure 6:
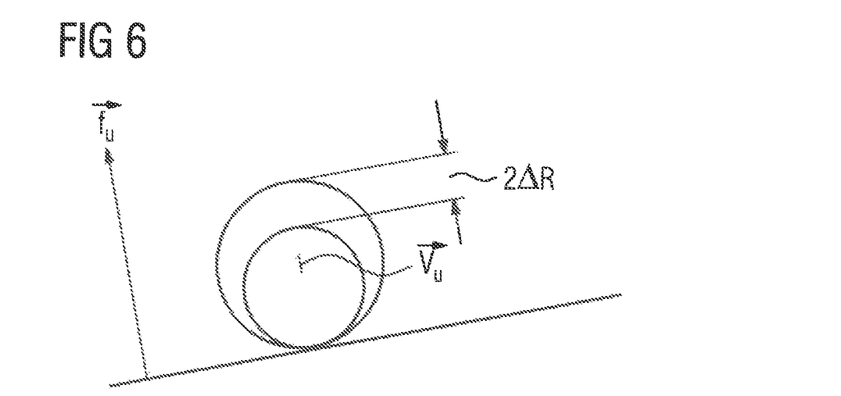
FIG. 6 shows a schematic diagram of the formation of a second auxiliary correction vector for circumferential milling with an end mill with corner rounding.

The second auxiliary correction vector $V_u$ for circumferential milling here is determined in a similar manner to the second auxiliary correction vector for circumferential milling with a ball mill. The direction of the auxiliary corrector vector $V_u$ also corresponds here to the direction of the surface normals $-f_u$:

$$V_u=(-f_u)\cdot \Delta R$$

FIG. 6. illustrates this relationship.

It should likewise be noted in FIGS. 5 and 6 that the difference in dimension from original mill to the mill which is actually available is shown disproportionately large for improved visibility. Moreover, FIGS. 5 and 6 show the position of the mill, as is assumed in accordance with the tool radius correction of the mill which is actually available. FIGS. 5 and 6 show that the mill path is corrected such that the milling paths for face and circumferential milling remain unchanged despite a modified tool.

Figure 7:
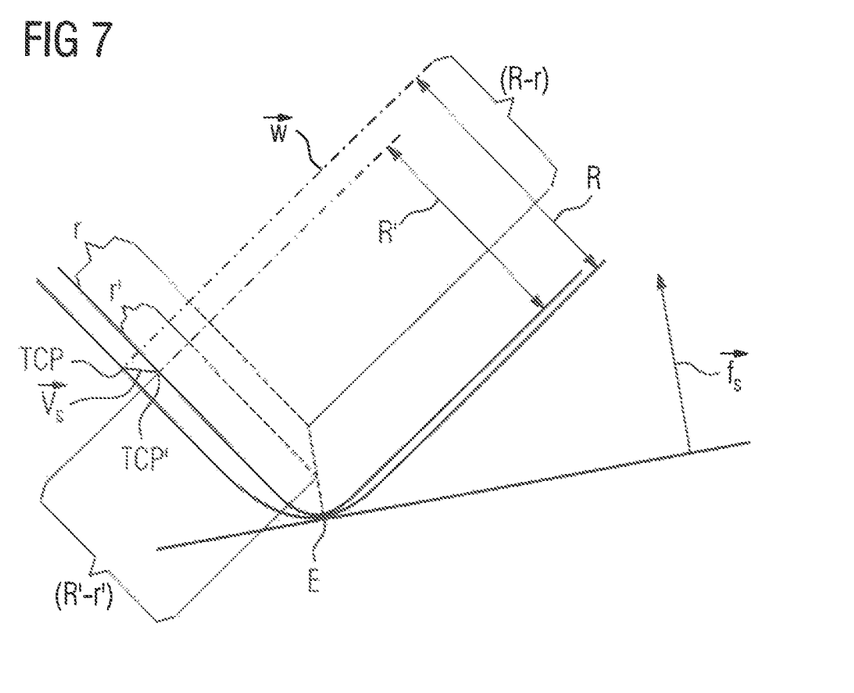
FIG. 7 shows a schematic diagram for forming a first auxiliary correction vector for face milling using an end mill with corner rounding, wherein the circumferential radius and the rounding radius are corrected.

If an end mill with corner rounding is defined and the real mill differs with its dimensions, both in the end radius R with ΔR and also in the rounding radius r with Δr, from the defined mill, then the first auxiliary correction vector $V_s$ is determined for simultaneous face and circumferential milling from the tool orientation w and the surface normals $f_s$ for face milling and the radius differences ΔR and Δr according to the relationship $$V_s=((w\times f_s)\times w)\cdot (\Delta R-\Delta r)+(w\times f_s)\cdot \Delta r.$$

The second auxiliary correction vector $V_u$ is determined from the surface normals $f_u$ for circumferential milling and the radius difference ΔR according to the relationship $$V_u=(-f_u)\cdot \Delta R.$$

The correction vector V is formed from the first and second auxiliary correction vector $V_s$ or $V_u$ by way of adding a vector according to the relationship $$V=(V_s+V_u).$$

FIG. 7 illustrates the relationships described above for the tool radius correction with the end mill with corner rounding, if both the end radius R and also the rounding radius r are reduced minimally. The end radius R of the defined mill and the end radius R' of the mill which is actually available differ by ΔR=R−R'. The rounding radius r of the defined mill and the shaft radius r' of the mill which is actually available differ by Δr=r−r'. The point of intervention of the mill on the milling path for face milling is referred to with E. The first auxiliary correction vector $V_s$ for end milling is determined so that the workpiece machining takes place again at this point of intervention E despite the modified geometry of the mill. It is apparent in FIG. 7 that the first auxiliary correction vector $V_s$ for face milling points from the tool reference point TCP of the defined mill to the tool reference point TCP' of the available mill.

The second auxiliary correction vector $V_u$ is determined similarly, as already described in FIG. 6.

In summary, the described method for 3D tool radius correction requires the original contour or the mill path, dimensions of the mill, on the basis of which the mill path has been calculated, and the differences in dimension, the mill orientation and two surface normals, namely the surface normal for the face milling surface and the surface normal for the circumferential milling surface. This data comprises the input variables for determining the correction vector.

The determination of a correction vector, described above on the basis of the exemplary embodiments, relating to the 3D radius correction with simultaneous face and circumferential milling also allows for a highly precise and rapid production with mills which have differences in dimension compared with the mills defined in the CAD-CAM process. In practice mostly only small changes in radius are to be corrected compared with the standard tool (radius with which the CAM program has calculated), which result from wear, for instance. A smaller mill radius can be calculated without any problems. With a larger radius, there is a risk of the tool colliding with the workpiece contour.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A method for 3D radius correction in CNC milling, comprising:
    calculating for an original milling tool a mill path in form of positions of the original milling tool that produces a surface contour on a workpiece;
    with an NC program, specifying positions of a mill cutter tip on the workpiece based on dimensions of the mill cutter tip, for which the mill path producing the surface contour has been calculated;
    specifying dimensional differences between a milling tool actually available for machining the workpiece, and the original milling tool;
    specifying, for each position of the mill cutter tip, a surface normal of an end face milling surface and a surface normal of a circumferential milling surface;
    specifying, for each position of the mill path, a milling tool orientation, which specifies a spatial orientation of the milling tool axis;
    specifying, for each position of the mill path, a correction vector from the milling tool orientation and the dimensional differences and the surface normal of the end face milling surface and the surface normal of the circumferential milling surface; and
    machining the workpiece to produce the surface contour by simultaneous end face milling and circumferential milling by traversing the mill path specified by the NC program with the actually available milling tool and correcting the dimensional differences with the correction vector.

2. The method of claim 1, further comprising:
    forming a first auxiliary correction vector from the milling head orientation and the dimensional differences and the surface normal for end face milling;
    forming a second auxiliary correction vector from the milling head orientation and the dimensional differences of the milling head and the surface normal for circumferential milling; and
    determining the correction vector by adding the first auxiliary correction vector and the second auxiliary correction vector.

3. The method of claim 2, wherein the milling tool is a ball end mill, the method further comprising
    determining the first auxiliary correction vector from the milling head orientation, the surface normal for end face milling and a radius difference of a ball head of the ball end mill according to the relationship:

$$V_s=(w-f_s) \cdot \Delta R,$$

wherein $V_s$ is the first auxiliary correction vector, w is the milling head orientation, $f_s$ is the surface normal for end face milling, and $\Delta R$ is the radius difference,
    determining the second auxiliary correction vector from the surface normal for circumferential milling and the radius difference of the ball head according to the relationship:

$$V_u=(-f_u) \cdot \Delta R,$$

wherein $V_u$ is the second auxiliary correction vector, $f_u$ is the surface normal for circumferential milling, and $\Delta R$ is the radius difference, and
    determining the correction vector V by adding $V_s$ or $V_u$ according to the relationship:

$$V=(V_s+V_u).$$

4. The method of claim 2, wherein the milling tool is an end mill with corner rounding, the method further comprising
    determining the dimensional difference only from a radius difference of a shank radius of the end mill,
    determining the first auxiliary correction vector from the milling head orientation, the surface normal for end face milling and the radius difference according to the relationship:

$$V_s=((w \times f_s) \times w) \cdot \Delta R,$$

wherein $V_s$ is the first auxiliary correction vector, w is the milling head orientation, $f_s$ is the surface normal for end face milling, and $\Delta R$ is the radius difference,
    determining the second auxiliary correction vector from the surface normal for circumferential milling and the radius difference according to the relationship:

$$V_u=(-f_u) \cdot \Delta R,$$

wherein $V_u$ is the second auxiliary correction vector, $f_u$ is the surface normal for circumferential milling, and $\Delta R$ is the radius difference, and
    determining the correction vector V by adding $V_s$ or $V_u$ according to the relationship:

$$V=(V_s+V_u).$$

5. The method of claim 2, wherein the milling tool is an end mill with corner rounding, the method further comprising
    determining the dimensional difference from a radius difference of a shank radius of the end mill and a radius difference of a rounding radius of the end mill,
    determining the first auxiliary correction vector from the milling head orientation, the surface normal for end face milling and the radius differences of a shank radius and the rounding radius according to the relationship:

$$V_s=((w \times f_s) \times w) \cdot (\Delta R - \Delta r) + (w - f_s) \cdot \Delta r;$$

wherein $V_s$ is the first auxiliary correction vector, w is the milling head orientation, $f_s$ is the surface normal for end face milling, $\Delta R$ is the radius difference of the shank radius and $\Delta r$ is the radius difference of the rounding radius,
    determining the second auxiliary correction vector from the surface normal for circumferential milling and the radius difference according to the relationship:

$$V_u = (-f_u) \cdot \Delta R,$$

wherein $V_u$ is the second auxiliary correction vector, $f_u$ is the surface normal for circumferential milling, and, $\Delta R$ is the radius difference of the shank radius, and
    determining the correction vector V by adding $V_s$ or $V_u$ according to the relationship:

$$V=(V_s+V_u).$$

6. A numerically controlled milling machine constructed for simultaneously milling a workpiece using end face and circumferential milling, comprising
    a machine tool controller configured to
    calculate for an original milling tool a mill path in form of positions on the workpiece that produces a surface contour,
    with an NC program, specify positions of a mill cutter tip on the workpiece based on dimensions of the mill cutter tip, for which the mill path producing the surface contour has been calculated,
    specify dimensional differences between a milling tool actually available for machining the workpiece, and the original milling tool,
    specify, for each position of the mill cutter tip, a surface normal of an end face milling surface and a surface normal of a circumferential milling surface,
    specify, for each position of the mill path, a milling tool orientation, which specifies a spatial orientation of the milling tool axis,
    specify, for each position of the mill path, a correction vector from the milling tool orientation and the dimensional differences and the surface normal of the end face milling surface and the surface normal of the circumferential milling surface, and
    cause the milling machine to produce the surface contour of the workpiece by simultaneous end face milling and circumferential milling by traversing the mill path specified by the NC program with the actually available milling tool and correcting the dimensional differences with the correction vector.

* * * * *